United States Patent

[11] 3,556,240

[72] Inventor James C. Hartman
7575 S.E. Johnson Creek Blvd., Portland, Oreg. 97206
[21] Appl. No. 765,184
[22] Filed Oct. 4, 1968
[45] Patented Jan. 19, 1971

[54] HOOD LIFT APPARATUS IN A VEHICLE
4 Claims, 3 Drawing Figs.
[52] U.S. Cl..................................................... 180/69, 49/345
[51] Int. Cl..................................................... B62d 25/10
[50] Field of Search........................................... 180/69, 89; 296/76; 49/345, 339, 324, 263; 312/139, 319; 126/192; 98/2(.1); 220/36

[56] References Cited
UNITED STATES PATENTS
1,571,090 1/1926 Dawson....................... 180/69(C)
2,124,349 7/1938 Herbster....................... 49/263
2,193,111 3/1940 Peterson....................... 180/69(C)X
3,017,944 1/1962 Norrie.......................... 180/69(C)
3,232,368 2/1966 Sullivan....................... 180/69(C)
3,419,099 12/1968 Brumbaugh et al........... 180/69(C)

Primary Examiner—Benjamin Hersh
Assistant Examiner—Milton L. Smith
Attorney—Kolisch & Hartwell ABSTRACT: A vehicle including a frame, and a hood hinged to the frame for swinging between lowered and raised positions. Interposed between the frame and hood is a pedal-operated leverage mechanism which may be operated through the action of a person stepping on a pedal connected to the mechanism to swing the hood from its lowered to its raised position.

PATENTED JAN 19 1971
3,556,240
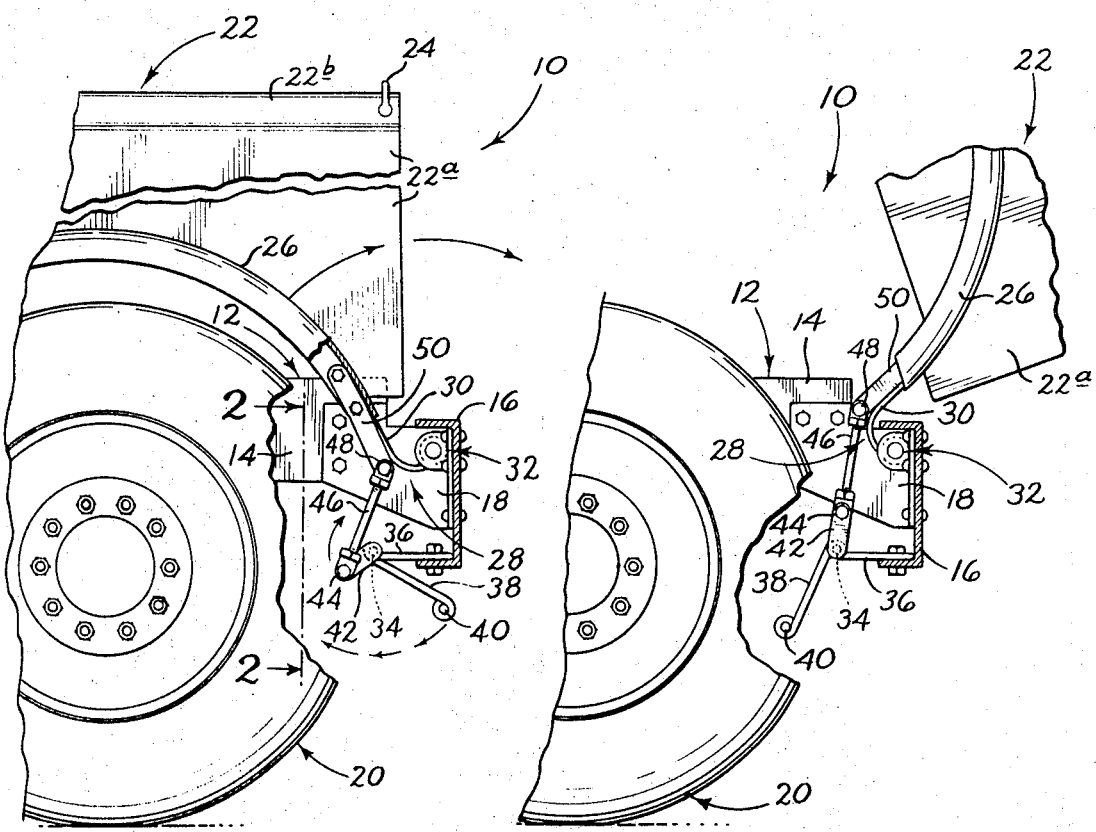
Fig. 1.
Fig. 3.
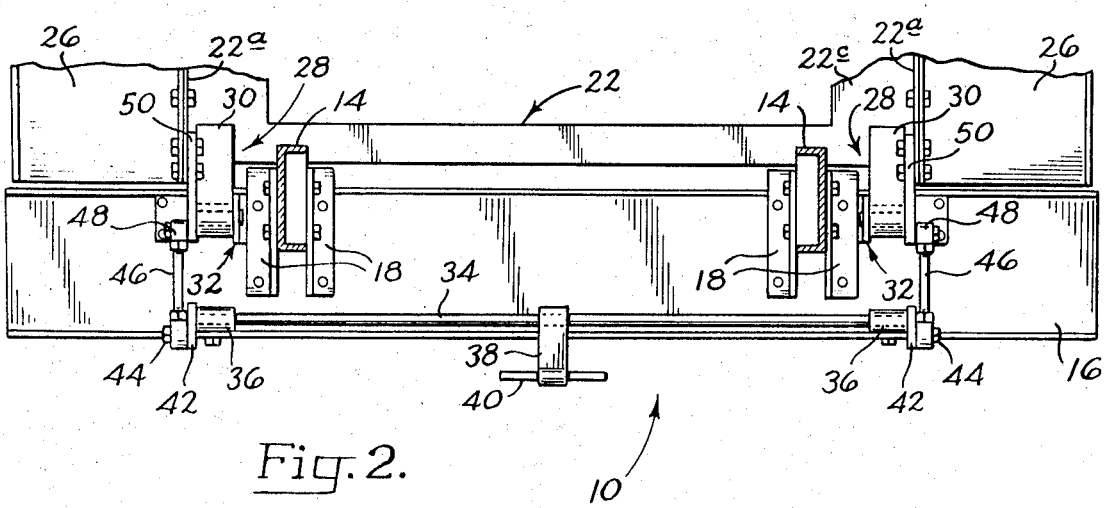
Fig. 2.
James C. Hartman
INVENTOR
BY Kolisch & Hartwell
Attys.

HOOD LIFT APPARATUS IN A VEHICLE

This invention pertains to apparatus for lifting the hood of a vehicle such as a truck. More particularly, it pertains to such apparatus which is pedal-operated, and which offers a mechanical advantage that facilitates lifting of such a hood.

Large vehicles, such as a tractor of the type employed to haul a trailer, typically have a relative massive hood hinged to the forward end of the frame in the vehicle. With present constructions, to obtain access to the engine, a person must stand upon the bumper or some other suitable footrest adjacent the forward end of the frame, and tug forwardly on the hood to swing it to a raised position exposing the engine. It is often difficult for one man to do this alone, particularly if any mud, etc. has collected on the hood, adding to its weight.

Some have proposed to solve the problem by incorporating spring devices counterbalancing the mass of the hood. This has not been entirely satisfactory, since they are under stress with the hood lowered, and as a consequence they tend to break down, and cause the hood to ride improperly when lowered. Further, massive springs are expensive, and take up room.

A general object of the present invention is to provide in a vehicle having a frame and a hood hinged to the frame for swinging between lowered and raised positions, novel apparatus for assisting in lifting the hood which takes care of the above-mentioned difficulties in a practical and satisfactory manner.

More specifically, an object of the invention is to provide such apparatus which is manually operated, and includes leverage mechanism providing a mechanical advantage whereby a man may lift the hood easily without springs needed to assist in the lifting.

A further object is to provide such apparatus which operates to releasably maintain the hood in a raised position once the same has been shifted such a position.

According to a preferred embodiment of the invention, the apparatus comprises a pedal-operated leverage mechanism which is interposed between the frame and the hood in the vehicle. The pedal protrudes from the front of the vehicle, and when stepped upon actuates the leverage mechanism to cause a lifting force to t be exerted on the hood. A man standing on the pedal further induces raising of the hood by pulling on an upper forward extremity of the hood.

A further object of the invention is to provide hood lift apparatus which is relatively simple in construction, and which occupies little space on a vehicle.

These and other objects and advantages attained by the invention will become more fully apparent as the description which follows is read in conjunction with the accompanying drawings, wherein:

FIG. 1 is a fragmentary side elevation illustrating the front part of a truck tractor having a hood hinged to and occupying a lowered position relative to a frame in the tractor, and apparatus provided according to the invention for lifting the hood;

FIG. 2 is a view taken along the line 2-2 in FIG. 1; and

FIG. 3 is a view which is similar to FIG. 1, but which illustrates the hood occupying a raised position relative to the frame in the tractor.

Turning now to the drawings, indicated generally at 10 is the front part of a truck tractor, or vehicle, of the type employed to a haul a trailer. Tractor 10 comprises a frame 12 including a pair of laterally spaced longitudinal members 14. Spanning the forward ends of members 14 is a front bumper 16 which extends transversely of the frame, and which is anchored to members 14 through brackets 18. Frame 12 is supported for movement over the ground by means of wheel assemblies, such as forward wheel assembly 20.

Indicated generally at 22 is a hood adapted to cover the tractor's engine (not shown). The hood comprises a pair of laterally spaced sides 22a, joined together through a top 22b (FIG. 1) and a front 22c (FIG. 2). Mounted adjacent the forward margin of top 22b, and immediately adjacent the center of the hood are handles, or grip members, such as the handle shown at 24 in FIG. 1. Suitably anchored on sides 22a in the hood are fenders 26 which, with the hood in its lowered position (as shown in FIG. 1), extend over the wheels in the forward wheel assemblies.

Hood 22 is pivoted for swinging about a substantially horizontal hinge axis which extends transversely of the forward end of frame 12 through a pair of hinge assemblies 28 located adjacent laterally opposite sides and the base of the hood. More specifically, each hinge assembly comprises an elongated spring member 30 having one end suitably anchored to a side 22a in the hood. The other end of each spring member is curved and turned back upon itself, and is pivoted to bumper 16 through a pivot connection 32. Spring members 30 in the hinge assemblies are conventional units, and are provided to permit a certain amount of relative movement between the hood and frame with the hood in its lowered position. Hinge assemblies 28 accommodate swinging of the hood upwardly and forwardly from its lowered position in FIG. 1, to a raised position as illustrated for the hood in FIG. 3.

Considering now the construction of pedal-operated apparatus provided according to the invention for assisting in swinging the hood from its lowered to its raised position, such apparatus comprises an elongated torsion bar 34. Bar 34 substantially parallels the pivot axis provided for the hood by pivot connections 32. Opposite ends of the bar are journaled on laterally spaced brackets 36 which are suitably anchored to the rear of bumper 16. Joined to a midregion of bar 34 and midway between the sides of the hood is a crank 38 extending radially from the bar and forwardly of the vehicle adjacent the base of the hood. Crank 38 supports and elongated pedal 40. As can be seen clearly in FIG. 1, with hood 22 in its lowered position, the crank extends forwardly and downwardly of bar 34, with pedal 40 located substantially directly below bumper 16 midway between the sides of the hood.

Anchored to each end of bar 34, and thus adjacent each side of the hood, and extending radially from the bar, is an elongated arm 42. Arms 42 are considerably shorter than crank 38. The outer end of each arm is pivoted, through a pivot connection 44, to one end of elongated link 46. The other end of each link is pivoted through a pivot connection 48, to a bracket 50 which is suitably anchored to a fender and thus forms part of the hood, Links 46 together comprise link means herein.

Explaining now how the described apparatus operates, to lift hood 22 from its lowered to its raised position, a person steps upon pedal 40 and grasps handles 22. He then leans forwardly (to the right in FIG. 1 ) in a manner tugging on the handles and pushing downwardly and rearwardly on the pedal. The leverage mechanism, including crank 38, torsion bar 34, links 46 and arms 42 and brackets 50, offers a considerable mechanical advantage between the pedal and hood. This is because of the difference in length between crank 38 and arms 52, and the interposition of links 46 between the arms and brackets 50. Because of such advantage, with a person's weight supported on the pedal, and with the person leaning in the manner described, a substantial upward force results on the hood which swings the same easily toward its raised position shown in FIG. 3.

It will be noted that once the hood is raised it stays there without the need for propping it in place. This is because of the fact that the hood, on swinging forwardly to its final raised position, swings past an overcenter position with respect to the pivot axis provided by pivot connections 32. With the hood moved past its overcenter position, gravity then functions to tend to pull the hood further forwardly about the pivot axis provided, but such is prevented by the means that defines the final raised position on the hood. In the embodiment of the invention herein disclosed, it is the links 46 and arms 42 which define its raised position by assuming the position shown in FIG. 3, where each link is aligned with its associated arm, and the link and arm extend along a straight line between bar 34 and pivot connection 48.

To lower the hood, a person simply urges it back through its overcenter position, whereupon gravity then acts to return it to its lowered position. Lowering may be controlled by exerting a slight force on pedal 40 braking downward movement.

Thus, the invention provides novel apparatus which greatly simplifies and eases the task of lifting the engine-covering hood in a tractor. The leverage mechanism which is operated by pedal 40, because of the mechanical advantage which it offers, permits even a relatively light person easily to swing the hood to its raised position.

The apparatus is convenient to use because of the central location of the pedal relative to opposite sides of the hood, and because of the proximity of the pedal to handles 24. Skewing during lifting is prevented because of the novel laterally spaced links and arms which operate simultaneously to transmit a lifting force to opposite sides of the hood.

It will be apparent also that the proposed apparatus is relatively simple in construction, and occupies little space on a truck.

While an embodiment of the invention has been described herein, it is appreciated that variations and modifications may be made without departing from the spirit of the invention. Accordingly, it is desired to cover all such variations and modifications which are apparent to those skilled in the art and that come within the scope of the appended claims.

I claim:

1. In a vehicle including a frame and a hood hinged adjacent a forward extremity to the frame for swinging about a hinge axis from a lowered to a raised o position, said hood including adjacent the top and forward extremity thereof a grip element for hand gripping:

leverage mechanism operatively connected to said hood actuatable, with the hood in its said lowered position, to swing the same to its said raised position;

an exposed pedal operatively connected to said leverage mechanism extending forwardly on the vehicle from this connection with the leverage mechanism, said pedal being located adjacent the base of the hood between the hood's sides and substantially directly below said grip element, said pedal being adapted to be acted upon by a person's foot and operable when so acted upon to actuate said mechanism; and said leverage mechanism being constructed with a mechanical advantage provided between said pedal and said hood whereby when a certain force is applied by a foot to said pedal a considerably greater force tending to swing said hood is applied through said mechanism to said hood.

2. In a vehicle including a frame and a hood hinged adjacent a forward extremity to the frame for forward swinging about a hinge axis from a lowered to a raised position:

leverage mechanism operatively connected to said hood actuatable, with the hood in its said lowered position, to swing the same to its said raise position, said leverage mechanism comprising an elongated torsion bar extending transversely of the vehicle journaled for rotation about its longitudinal axis, a pair of arms joined to said bar adjacent opposite sides of said hood, and a link for each arm linking the arm to a side of said hood; and an exposed pedal operatively connected to said leverage mechanism adapted to be acted upon by a person's foot and operable when so acted upon to actuate said leverage mechanism, said leverage mechanism being constructed with a mechanical advantage provided between said pedal and said hood whereby when a certain force is applied by a foot to said pedal, a considerably greater force tending to swing said hood is applied through said mechanism to said hood.

3. The vehicle of claim 2, wherein said pedal is joined to said torsion bar through a crank located between the ends of the bar and beneath the hood substantially midway between the sides of the hood.

4. The vehicle of claim 2, wherein said torsion bar is disposed beneath the hood adjacent the front of the hood, and the link for each arm which links the arm to a side of the hood is pivotally connected to the hood at a point spaced radially to the rear of said hinge axis.